(12) United States Patent
Zhao et al.

(10) Patent No.: US 9,098,889 B2
(45) Date of Patent: Aug. 4, 2015

(54) METHOD FOR QUANTITATIVE PREDICTION OF MATRIX ACIDIZING TREATMENT OUTCOMES

(71) Applicant: Schlumberger Technology Corporation, Sugar Land, TX (US)

(72) Inventors: Weishu Zhao, Quincy, MA (US); Xiangdong Qiu, Al Khobar (SA); Steve Dyer, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 250 days.

(21) Appl. No.: 13/752,859

(22) Filed: Jan. 29, 2013

(65) Prior Publication Data

US 2014/0212006 A1    Jul. 31, 2014

(51) Int. Cl.
*G06T 7/00*     (2006.01)
*G06T 17/05*    (2011.01)
*E21B 49/00*    (2006.01)

(52) U.S. Cl.
CPC ............. *G06T 7/0004* (2013.01); *E21B 49/005* (2013.01); *G06T 17/05* (2013.01); *G06T 2207/10081* (2013.01); *G06T 2207/30132* (2013.01); *G06T 2210/24* (2013.01)

(58) Field of Classification Search
None
See application file for complete search history.

(56) References Cited

U.S. PATENT DOCUMENTS

| | | | | |
|---|---|---|---|---|
| 4,982,086 A | * | 1/1991 | Withjack | 250/255 |
| 5,359,194 A | * | 10/1994 | Moss | 250/255 |
| 5,430,291 A | * | 7/1995 | Pepin et al. | 250/255 |
| 5,979,557 A | * | 11/1999 | Card et al. | 166/300 |
| 6,196,318 B1 | | 3/2001 | Gong et al. | |
| 7,657,415 B2 | | 2/2010 | Panga et al. | |
| 2003/0225521 A1 | * | 12/2003 | Panga et al. | 702/6 |
| 2006/0184346 A1 | * | 8/2006 | Panga et al. | 703/9 |
| 2007/0244681 A1 | * | 10/2007 | Cohen et al. | 703/10 |
| 2008/0015832 A1 | * | 1/2008 | Tardy | 703/10 |
| 2010/0131204 A1 | * | 5/2010 | Dvorkin et al. | 702/6 |
| 2013/0261979 A1 | * | 10/2013 | Al-Muthana et al. | 702/12 |
| 2013/0274155 A1 | * | 10/2013 | Nasr-El-Din et al. | 507/241 |
| 2014/0057356 A1 | * | 2/2014 | Qiu et al. | 436/34 |

OTHER PUBLICATIONS

Luo et al. "A Model and Interpretation Method of Pressure Decline for Acid Fracturing." International Conference on Computational Problem-Solving, Oct. 19, 2012, pp. 236-341.*
Taylor et al. "Measurement of Acid Reaction Rates with the Rotating Disk Apparatus." Journal of Canadian Petroleum Technology, vol. 48, No. 6, Jun. 2009, pp. 66-70.*

(Continued)

*Primary Examiner* — Jon Chang
(74) *Attorney, Agent, or Firm* — Rachel E. Greene; Tim Curington

(57) ABSTRACT

In one embodiment, the current application discloses a method comprising: performing a computed tomography (CT) porosity scan on a core sample, the core sample comprising a portion of a formation of interest; in response to the CT porosity scan, interpreting a porosity profile of the core sample; and in response to the porosity profile, modeling a response of a formation of interest to a predetermined treatment to determine a reacted formation configuration, wherein the predetermined treatment comprises an acid fluid treatment schedule, and wherein the modeling further comprises modeling acid fluid flow through the formation of interest having the porosity profile, and wherein the modeling further comprises accounting for acid reaction products during the predetermined treatment and shut-in period.

20 Claims, 10 Drawing Sheets

(56) References Cited

OTHER PUBLICATIONS

Balakotaiah, "Shape Normalization and Analysis of the Mass Transfer Controlled Regime in Catalytic Monoliths", Chemical Engineering Science, vol. 57 (8), 2002, pp. 1269-1286.

Bazin, B., "From Matrix Acidizing to Acid Fracturing: A Laboratory Evaluation of Acid/Rock Interactions", SPE Production & Facilities, vol. 16 (1), Feb. 2001, pp. 22-29.

Buijse, M.A., "Understanding Wormholing Mechanisms Can Improve Acid Treatments in Carbonate Formations", SPE Production & Facilities, vol. 15(3), 2000, pp. 168-175.

Civan, Frank, "Scale effect on Porosity and Permeability: Kinetics, Model and Correlation", AIChE Journal, vol. 47 (2), 2001, pp. 271-287.

Doane, et al., "Special Core Analysis Designed to Minimize Formation Damage Associated With Vertical/Horizontal Drilling Applications", Journal of Canadian Petroleum Technology, vol. 38 (5), 1999, pp. 35-45.

Fredd, et al., "Influence of Transport and Reaction on Wormhole Formation in Porous Media", AIChE Journal, vol. 44 (9), 1998, pp. 1933-1949.

Fredd, C.N., "Dynamic Model of Wormhole Formation Demonstrates Conditions for Effective Skin Reduction During Carbonate Matrix Acidizing", SPE 59537—SPE Permian Basin Oil and Gas Recovery Conference, Mar. 21-23, 2000, Midland, Texas, 14 pages.

Golfier, et al., "On the ability of a Darcy-scale model to capture wormhole formation during the dissolution of a porous medium", Journal of Fluid Mechanics, vol. 457, 2002, pp. 213-254.

Gupta, et al., "Heat and mass transfer coefficients in catalytic monoliths", Chemical Engineering Science, vol. 56 (16), 2001, pp. 4771-4786.

Hoefner, et al., "Pore Evolution and Channel Formation During Flow and Reaction in Porous Media", AIChE, vol. 34 (1), 1988, pp. 45-54.

Huang, et al., "Prediction of Wormhole Population Density in Carbonate Matrix Acidizing", SPE 54723—SPE European Formation Damage Conference, May 31-Jun. 1, 1999, The Hague, Netherlands, 11 pages.

Huang, et al., "Reaction Rate and Fluid Loss: The Keys to Wormhole Initiation and Propagation in Carbonate Acidizing", SPE 37312—International Symposium on Oilfield Chemistry, Feb. 18-21, 1997, Houston, Texas, 10 pages.

Paccaloni, et al., "Advances in Matrix Stimulation Technology", Journal of Petroleum Technology, vol. 45(3), Mar. 1993, pp. 256-263.

Panga, et al., "Two-scale continuum model for simulation of wormholes in carbonate acidization", AIChE Journal, vol. 51 (12), 2005, pp. 3231-3248.

Pomés, et al., "On the Use of Upscaling Methods to Describe Acid Injection in Carbonates", SPE 71511—SPE Annual Technical Conference and Exhibition, Sep. 30-Oct. 3, 2001, New Orleans, Louisiana, 11 pages.

Van Brakel, Jaap, "Modeling in Chemical Engineering", International Journal for Philosophy of Chemistry, vol. 6, 2000, pp. 101-116.

Wang, et al., "The Optimum Injection Rate for Matrix Acidizing of Carbonate Formations", SPE 26578—SPE Annual Technical Conference and Exhibition, Oct. 3-6, 1993, Houston, Texas, 13 pages.

\* cited by examiner

METHOD FOR QUANTITATIVE PREDICTION OF MATRIX ACIDIZING TREATMENT OUTCOMES

RELATED APPLICATION DATA

None.

BACKGROUND

The statements in this section merely provide background information related to the present disclosure and may not constitute prior art.

The technical field generally, but not exclusively, relates to completing multiple fracturing stages in a wellbore. Acid treatments are utilized to stimulate fluid formations, including providing enhancements to productivity and/or injectability. Acid treatments within compatible formation rocks react with the formation, forming porous "wormholes" in the formation and improving fluid communication between the wellbore and the formation. The final wormhole configuration—size and depth of wormholes, as well as distribution about the wellbore and overall porosity generation out into the formation—determines the success of the treatment and the amount of stimulation provided. However, presently known modeling techniques do not robustly model the wormhole formation process. Accordingly, it can be difficult or impossible to converge on a best treatment practice for a field or region, to determine the success of an individual treatment during or after the treatment, to economically develop a field or region that has only a few (or one) wells to be treated, and/or to analytically test replacement treatment techniques to generate improvements or cost savings into the treatment process.

SUMMARY

According to some embodiments, there is provided a method comprising: performing a computed tomography (CT) porosity scan on a core sample, the core sample comprising a portion of a formation of interest; in response to the CT porosity scan, interpreting a porosity profile of the core sample; and in response to the porosity profile, modeling a response of a formation of interest to a predetermined treatment to determine a reacted formation configuration, wherein the predetermined treatment comprises an acid fluid treatment schedule, and wherein the modeling further comprises modeling acid fluid flow through the formation of interest having the porosity profile, and wherein the modeling further comprises accounting for acid reaction products during the predetermined treatment and shut-in period.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

Figure 1:
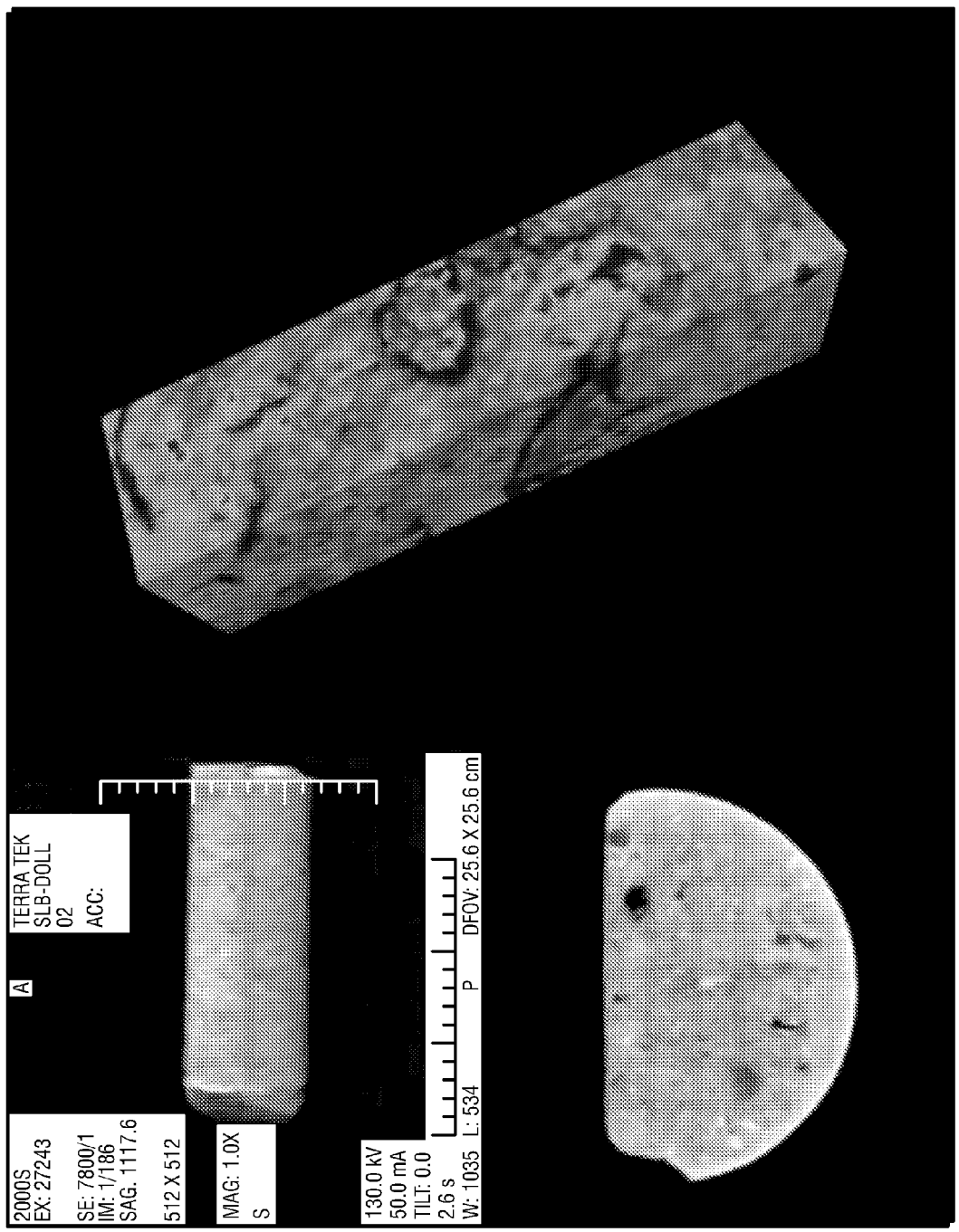
FIG. 1 is an exemplary 3-D porosity description for a core according to an embodiment of the current application.

For the purposes of promoting an understanding of the principles of the disclosure, reference will now be made to the embodiments illustrated in the drawings and specific language will be used to describe the same. It will nevertheless be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciate and understands that any and all data points within the range are to be considered to have been specified, and that the Applicant possessed knowledge of the entire range and all points within the range.

The schematic flow descriptions which follow provide illustrative embodiments of performing procedures for multi-stage completions in a wellbore. Operations illustrated are understood to be examples only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art including operator entry, and/or by receiving a value by which the interpreted parameter can be calculated, and/or by referencing a default value that is interpreted to be the parameter value.

While the operations described herein are generally described in the context of matrix acidizing, the operations may additionally or alternatively be utilized in the context of acid fracturing. A given treatment may be modeled generally and need not be characterized particularly as a matrix acidizing or acid fracturing treatment. For example a model may predict the occurrence or lack of induced fractures, and model the resulting formation reaction as a matrix acidizing or acid fracturing treatment accordingly. The modeling of hydraulic fracturing, including the fracture direction, width, height generation, and length is known in the art and not described herein in detail. The acidizing model changes from a two-dimensional or three-dimensional radial matrix flow model into an acid reaction within the faces of the hydraulic fractures generated, but otherwise the operations described herein are fully applicable to acid fracturing treatments. Certain operations, such as utilizing spent acid diffusion coefficients as the acid is expended, and utilizing the formation porosity and mineralogy homogeneity, will improve the output of an acid fracturing model similarly to the output of a matrix acidizing model.

An example procedure includes an operation to perform a computed tomography (CT) porosity scan on a core sample, the core sample being from a formation of interest. The porosity scan may include any type of porosity scan known in the art, including at least a density determination such as an X-ray scan. Additionally or alternatively, ultrasound scanning, scanning electron microscope scanning, nuclear magnetic resonance (NMR) scanning, transmission electron microscope scanning, a scanning tunneling microscope, and/or the use of proprietary or commercially available scans (e.g. QEMSCAN® from the FEI Company) may be utilized, and any information therefrom may be mapped using the core(s). The construction of CT and other 3-dimensional data from multiple scan operations is known and not described further herein. Referencing FIG. 1, an example 3-dimensional porosity description for a core is depicted.

The CT data depicted in FIG. 1 includes porosity data. Additionally or alternatively, the data may include natural fracturing presence and orientation, wettability data, mineralogy or rock composition data, micro-pore structure data, rock property data (e.g. Young's modulus, Poisson's ratio, etc.), and/or any other type of data that can be utilized to model or understand fluid flow through the core and represented formation of interest. Additionally or alternatively, well log information such as Formation Micro Image (FMI), or "micro-imaging" techniques which visualize the borehole wall can be combined with other well log information such as acoustic, sonic, resistivity, dielectric, NMR, nuclear or electron capture spectroscopy log (ECS) log to describe the rock formation, its mineral content, wettability and fluid saturation within the near wellbore region. Such information can be interpreted and aggregated into the same modeling workflow to model or understand fluid flow through the core and represented formation of interest or to predict the wormhole propagation. In certain embodiments, the core may be oriented, including azimuthally, or in any other direction or coordinate system. The core sample may be understood to describe a bulk formation property, and/or to describe anisotropic formation properties, gradients of properties through the formation, and/or descriptions of variability through the formation (e.g. statistical or stochastic descriptions of variability). The information from a given core may be combined and/or averaged with information from other cores to develop an overall understanding of the formation and the relevant properties through the formation.

The example procedure further includes interpreting a porosity profile of the core sample. The porosity profile of the sample, and alternatively or additionally a profile of any other property of the core sample, is utilized to determine the modeled properties of the formation. For example, the observed porosity distributions, positioning, and/or gradients of porosity (or mineralogy, micro-pores, wettability, natural fracturing, etc.) may be assumed to exist throughout the formation. In certain embodiments, the porosity profile of the core sample is understood to be a statistical sampling of the formation, and may be combined with other information to develop the modeled properties of the formation. For example, and without limitation, where the porosity of the core sample is higher than the overall formation porosity (e.g. as known in the area or determined by well logs), or where multiple cores distributed throughout the formation are available (at multiple formation depths, wellbore azimuthal angles, and/or at offset wells in the same formation), the date from the core sample may be treated as one statistically relevant portion of the entire data set, and the overall formation properties as modeled may be adjusted or offset according to the entire data set available. In certain embodiments, the data from the core sample may be utilized to inform the determination of both averaged formation properties and of the variability (or heterogeneity) of the properties in the formation.

The example procedure further includes an operation, performed in response to the porosity profile (and/or other property profiles of the core sample), to model a response of a formation of interest to a predetermined treatment to determine a reacted formation configuration. The predetermined treatment is an acid fluid treatment schedule, including fluid type(s), treatment rates, and relevant fluid constituents such as, but not limited to, acid concentrations, fluid loss additives, fluid viscosifiers, fluid breakers, fibers, surfactants, and/or acid inhibitors. The modeling includes modeling acid fluid flow through the formation of interest having the porosity profile (and/or other property profiles). The modeling includes accounting for acid reaction products during the predetermined period and the shut-in period. In certain embodiments, an overflush may be utilized to send acid away from the wellbore deep into the formation, and the modeling may be terminated with the overflush.

In certain embodiments, the reaction products may be modeled as they are flushed into the formation. When the flow is reversed and the fluids are produced back to the wellbore, the same model may be utilized to predict the chemical composition of the fluids produced. This composition information can be collected by certain downhole chemical analysis devices, such as laser or X-ray spectroscopy (e.g. Raman, XPS, XRF, etc.), high energy magnetic resonance (e.g. NMR), or specific chemical sensors (such as "MEMS" sensors tuned to measure specific chemical species). The composition and quantity of reaction byproducts produced back through the wellbore is a measure of the success of the acidisation treatment and the flow back or "well clean up".

Figure 2:
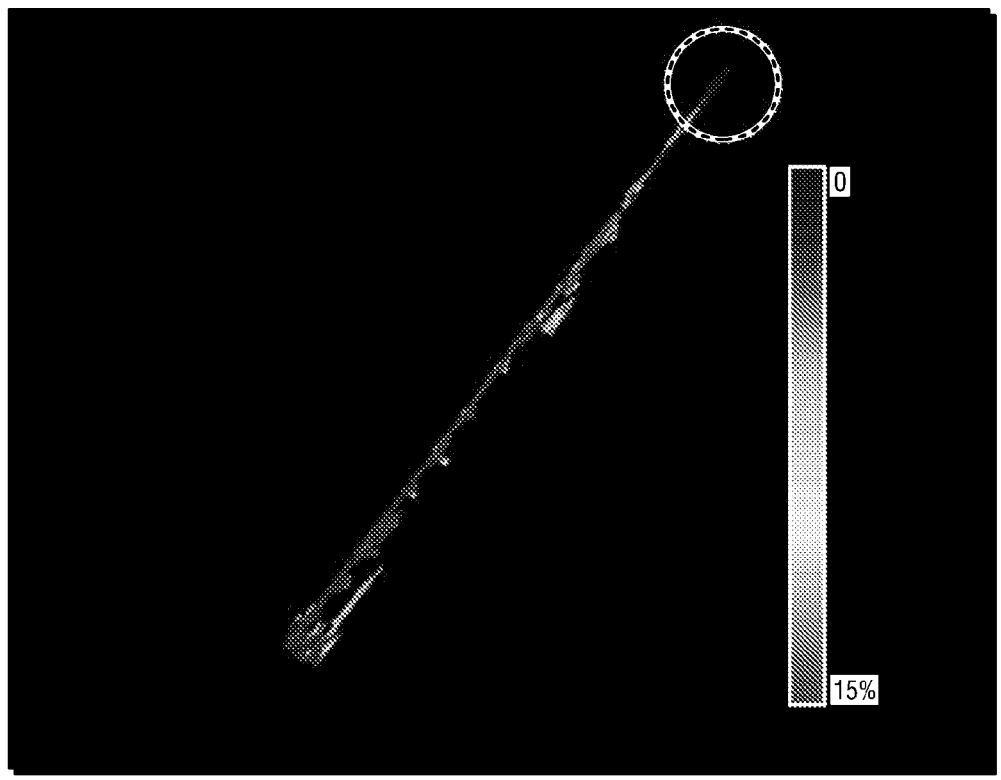
FIG. 2 illustrates a high resolution numerical model of a wormhole according to an embodiment of the current application.
Figure 3:
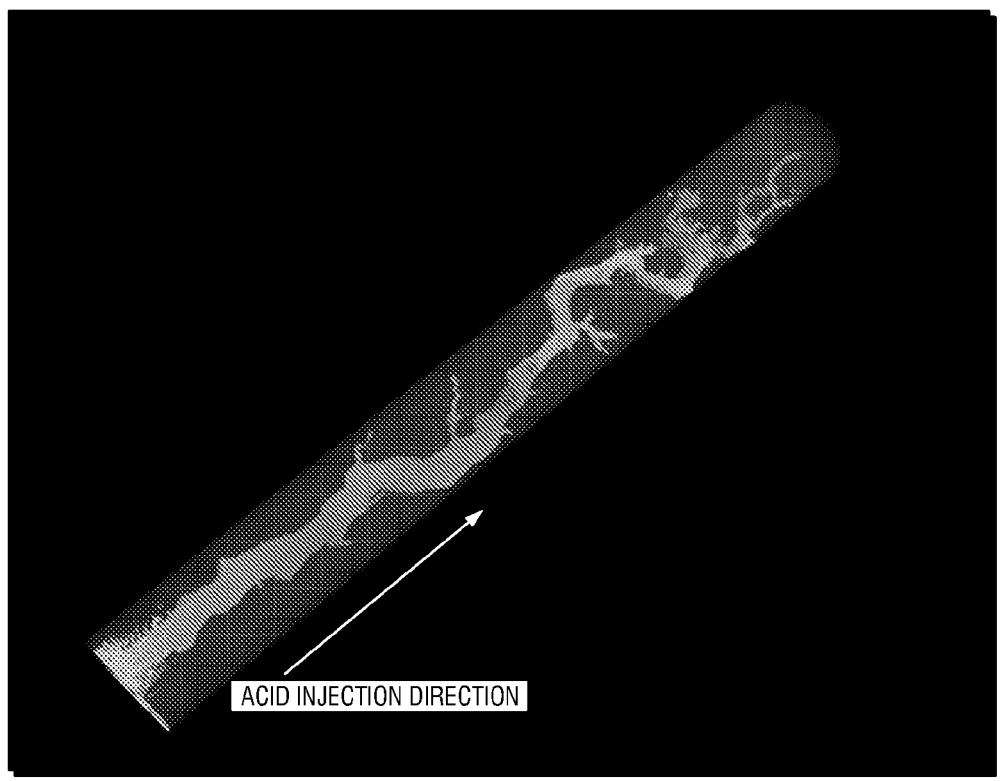
FIG. 3 shows an experimental core sample that has been acid treated according to an embodiment of the current application.

The following discussion about the acid reaction rate is a non-limiting example, and is not intended to limit any theory of operation of the present disclosure. The acid reaction in the formation proceeds in several steps, including acid delivery into a primary wormhole, and diffusion of ions from the bulk fluid to the surface of the formation face in the wormhole. After the acid reaction at the surface of the formation, the reactive products must diffuse away from the surface, and fresh acid diffuse to the surface for the reaction to proceed. Additionally, when primary wormholes are developed, minor wormholes and/or micro-pores develop, and mass transfer into the micro-pores is relevant to the achieved reaction rate. Over time as the reaction progresses, the porosity near the wellbore becomes relatively large, and the average wormhole size of the acting acid away from the wellbore is relatively small. At some distance from the wellbore, the acid is spent to the point where the presence of reaction byproducts inhibits diffusion of the remaining spent acid brings the reaction rate to a negligible value and further wormhole development ceases. Referencing FIG. 2, a high resolution numerical model of a wormhole was simulated. At the lower left portion, a large wormhole having low surface area to volume and fresh acid combine to make a relatively high acid concentration region. At the circled upper right portion, a high surface area to volume ratio and extended exposure time to the formation result in a low acid concentration that is essentially spent. Referencing FIG. 3, an experimental core sample that was acid treated is shown, and it can be seen that the injection side forms a large wormhole cavity, diminishing to the right as the acid etches the core until the acid is expended and wormhole generation ceases. The heterogeneity and in-situ porosity profile of the formation affects the rate and progression of the various wormhole and acid expenditure regimes, and the corresponding overall configuration of the treated formation after the treatment is completed. Accordingly, the heterogeneity and in-situ porosity profile of the formation affect the overall success of the treatment, and treatment design accounting for these factors allows for an improved stimulation outcome.

Previously known acid reaction models have not accounted for the porosity profile in the formation, and further have not accounted for the effects on the reaction rate of the spent acid byproducts. In many in-organic acid situations, the rate limiting step of the reaction is mass diffusion from the bulk fluid to the formation surface. Accordingly, the concentration of acid, spent acid, and reaction byproducts throughout the treated formation areas affects the rate and progression of the various wormhole and acid expenditure regimes, and the corresponding overall configuration of the treated formation after the treatment is completed. Accordingly, the reaction byproducts and remaining acid concentrations affect the overall success of the treatment, and treatment design accounting for these factors, and/or further accounting for porosity heterogeneity, allows for an improved stimulation outcome. In the case where the rate limitation is not mass transfer—for instance for retarded acid systems and/or weak organic acids or chelating agents, the same model can be utilized. The reaction rate may need to be input at different concentrations.

Additionally or alternatively, accounting for heterogeneity and in-situ wettability, micro-pores, natural fracturing, and/or other factors determinable from a core sample can improve the final stimulation outcome. A stimulation outcome improvement can include, without limitation, a cost savings in a treatment, an initial production rate, a payout time for the cost of a treatment, a reduction in uncertainty or sensitivity to noise or failures during a treatment, an enhanced total recovery, a reduced amount of usage of a material during a treatment (e.g. overall fluid, certain chemicals, radioactive tracers, etc.), and/or a reduction in the time of the treatment. Furthermore, a stimulation outcome improvement can include, without limitation, a reduced cycle time to generate a best practice treatment, an improved initial treatment after analytical modeling, and/or a reduction in the number of physical treatments performed before analytical modeling converges on a best practice treatment. All of the described improvements and modeling usage examples are non-limiting and illustrative examples only.

Additionally, the model can provide the following information versus time: explicit prediction of wormhole depth of penetration and wormhole density; chemical composition of byproducts from the reaction process; exothermal reaction temperature information; and porosity generation. This information can be further utilized in other inversion techniques to predict well log responses—for instance resistivity or dielectric logging (electrical); compression and shear acoustic wave propagation (sonic log); pore size distribution from magnetic resonance (NMR); mineral distribution for nuclear responses (electron capture spectroscopy); fluid flow profiles from flow velocity measurements (eg spinner, tracer profile logs). This information when aggregated may be used to determine the success of the wormhole treatment uniquely with respect to expected quantity, depth and profile of the wormholes generated. Prediction of well production profiles and productivity index (PI) are thus more robust.

Figure 4:
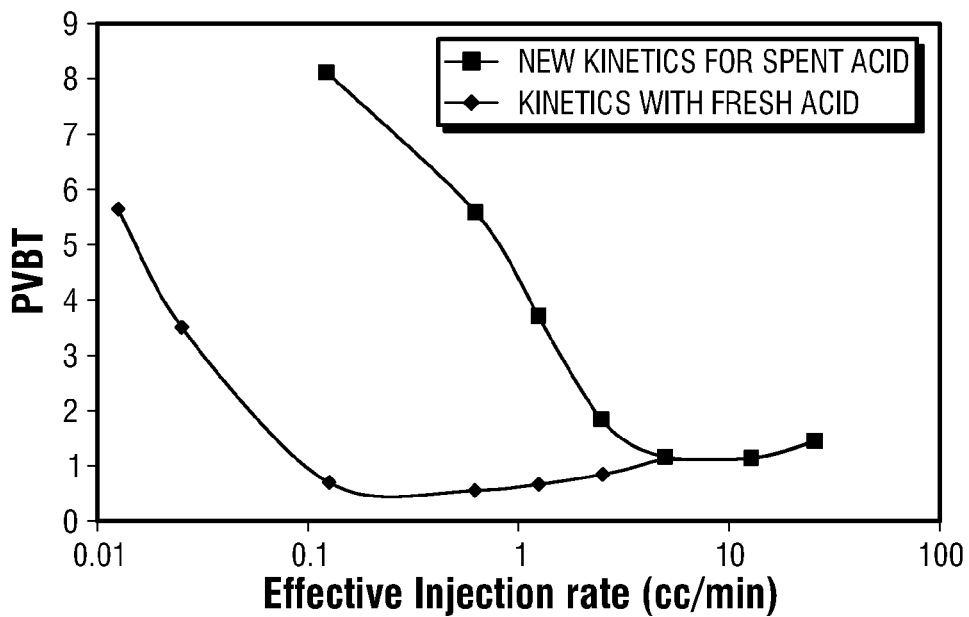
FIG. 4 illustrates pore volume injected at breakthrough (PVBT) vs. Effective injection rate with different kinetics used in simulations.

Referencing FIG. 4, numerical simulations illustrating the pore volume injected at breakthrough (PVBT) show that a much greater pore volume is injected with a fresh acid assumption before wormhole extension proceeds through the entire core than is likely to be realized in an actual sample. The depleted acid does not form large volume wormholes before extending as fresh acid would. Accordingly, a fresh acid kinetics model is unlikely to have the correct wormhole geometry, and matching predicted to actual production, and optimizing treatments, is unlikely to be as successful. Additionally, because the depleting acid extends more than fresh acid without engaging as large of a pore volume, the error introduced by lacking actual pore heterogeneity data (such as depicted in FIG. 1) may be greater than previously understood.

In certain embodiments, the procedure includes modeling the response of the formation of interest in a two-dimensional or a three-dimensional model. The use of oriented core data, and/or the use of multiple cores, can allow the analytical model to utilize three-dimensional property data for the formation. This may also be performed by referring to well log information such as FMI, acoustic, and other well logs. Core data can be calibrated to well log data and distributions of expected formation properties made through one or more "digital rock" model(s). Accordingly, the modeling can be performed in a two-dimensional or three-dimensional model of the formation and formation properties. In certain embodiments, the degree and direction of heterogeneity in the core sample(s) is utilized to determine whether a two-dimensional model is sufficient or a three-dimensional model is suggested, to determine modeling element grid sizes, and/or to suggest an appropriate modeling element grid coordinate system (e.g. Cartesian, polar, spherical, irregular, etc.).

In certain embodiments, the procedure includes accounting for a dynamic and distributed diffusion coefficient of the acid fluid within the formation of interest during the predetermined treatment. A dynamic diffusion coefficient allows for the diffusion coefficient to change with time as the fluid composition within the wormhole and formation change throughout the treatment. A distributed diffusion coefficient allows for the diffusion coefficients to be varied throughout out the fluid filled spaces in the formation as the treatment progresses and the fluid composition changes due to reactions, bulk material movement, and/or job staging that changes the injected fluids. Previously known models utilize a fresh acid composition assumption throughout the treatment, overestimating the reaction rate of the acid away from the wellbore.

Additionally, the dynamics of the surface reaction can be simulated. The reaction rate varies with surface acid concentration, and the mineral properties, but is also affected by a shape factor (roughness of surface), wettability of the surface, and additives to the acid solution—e.g. corrosion inhibitors, retarding agents, surfactants etc. The surface reaction rate (like the diffusion coefficient) can also be determined by reaction cell (rotating disk or other such apparatus) experimental data.

In certain embodiments, the modeling information is updated with actual treatment data, for example inserting the treatment pumping schedule as performed into the model to determine the modeled outcome of the actual treatment. Additionally or alternatively, information about achieved fluid compositions, temperatures, pressures observed, thermal data on fluid placement, rock acoustic properties, resistivity or dielectric response etc. may be entered into the model for matching and/or modeling. In certain embodiments, parameters of the model that are known with less certainty may be adjusted to match relevant aspects of the modeled outcome to observed data, such as treating pressures observed and/or fluid placement observed.

In certain embodiments, the procedure further includes an operation to interpret a mineralogy profile of the core sample, which may include the observed minerals and placement therein, including a quantitative description of heterogeneities, gradients or changes, and observed distributions. The modeling of the treatment is further performed in response to the mineralogy profile of the core sample. In certain further embodiments, the modeling further includes utilizing mineral specific reaction kinetics in response to the mineralogy profile of the core sample.

Most acid-formation reactions are exothermic, and heat is generated within the formation during the treatment. Additionally, depending upon the acid concentration and formation fluid composition, other sources of heat may be generated including through heat of mixing of strong acid with water. An example procedure further includes determining the heat generation and thermal conductivity within the formation of interest during the predetermined treatment. The thermal conductivity depends upon the mineral composition of the formation, the fluid in the formation, and the porosity of the formation. However, the thermal conductivity may also change over time as parts of the formation are consumed by the acid, and the thermal conductivity can vary according to heterogeneity or thin layering of various minerals in the formation. A statistical model of the mineralogy can be utilized to develop a mineralogy profile of the sample(s) and/or the formation, and the mineralogy profile can be used to determine the overall thermal conductivity of the formation, which can be updated according to the fluid composition in the formation during the treatment, and the physical changes to the formation during the treatment. In certain embodiments, the generated porosity within the formation of interest is determined during the treatment, and the thermal conductivity is adjusted during the treatment in response to the generated porosity.

In certain embodiments, the procedure includes interpreting a wettability profile of the formation, which can be determined from NMR data, micro-CT scans, flow testing, or other techniques to determine the wettability of the pore spaces in the core sample(s) and which can be used to develop a model of the wettability in the formation as a whole. The wettability may also be distributed and/or heterogeneous. The wettability affects the fluid flow through the formation, and the diffusion fluids and regimes between the bulk acid and the formation face. Accordingly, the modeled wettability can be used to improve the acidization model. An example procedure includes determining a diffusion coefficient and/or a reaction kinetics adjustment in response to the wettability profile. The operations to determine the wettability include, without limitation, determining wettability as a function of pore geometry, determining wettability as a function of mineralogy, and/or determining wettability empirically. In certain embodiments, the procedure includes modeling the wettability during the treatment. The wettability during the treatment may be modified by the introduction of fluids that are not soluble in the wetting fluid, and/or by the introduction of surfactants or other materials during the treatment. Modeling the wettability includes, without limitation, modeling the fluid placement and contact with fluids that are understood to change the wettability, and updating the wettability profile where a wettability change is likely to have occurred.

In certain embodiments, an example procedure includes modeling the resistivity changes of the injected fluid and the formation as the wormholes propagate into the formation. The fluid front ahead and surrounding the wormhole tunnel contains byproducts of the reaction—in many cases salts—dissolved in water and $CO_2$. The electrical properties of these fluids can be predicted by various thermodynamic reaction models, and/or can be measured within reaction cells in situ conditions. This information can be used to populate an electrical inversion model, whereby the saturation of the acid reaction byproducts is predicted, and the resistivity expected from the total system—rock, fluid and reaction by-products—are modeled. The electrical property model can then be used to predict resistivity and dielectric responses within the formation and coupled to electrical logging techniques (such as array induction or array resistivity) to determine depth of invasion of the reaction products during injection and flow back/clean up.

In certain embodiments, an example procedure includes modeling a number of acid types in the formation of interest during the predetermined treatment. The source of the number of acid types may be any source, including at least partial dissociation of a polyprotic acid, reaction of an acid creating another acid intermediate product, introduction of multiple acid types through various stages of the acidizing treatment, and/or the release or activation of encapsulated or otherwise inactive acids introduced into the acid fluid which allow the acid to become active after injection into the formation. An emulsified acid can also be modeled as multiple acids, where conditions that break down the emulsion cause the nature of the acid to change. Regardless of the source of the various distinct acid types, the procedure can include modeling each distinct acid type at the position and conditions within the treatment where the acid appears or is activated. In certain embodiments, the number of acid types include distinct acid fluids from treatment stages of the predetermined treatment or acid fluid changes during the treatment. Example and non-limiting acid fluid changes include an acid reaction product which acts as an acid under conditions present in the formation, an acid resultant product from a precursor, and/or an acid inhibitor change. In certain embodiments, two acids are distinct acid types if they have varying concentrations, compositions, inhibitors, or disassociation products. In certain embodiments, two elements of fluid may be treated as distinct acid types for certain modeling purposes, and as similar acid types for other modeling purposes.

An example procedure includes an acid fluid as an emulsified acid, and the modeling further includes an emulsion rheological model and/or an emulsion reaction kinetics model. An example procedure includes an acid fluid including a visco-elastic fluid, and the modeling further includes at least one of a visco-elastic rheological model and a visco-elastic reaction kinetics model. Example and non-limiting visco-elastic fluids can include any thixotropic fluid, with rheological modeling determining fluid viscosity in response to shear experienced by the fluid. Additional or alternative visco-elastic fluids include a polymer laden fluid, a gel laden fluid, an emulsion, a fiber laden fluid, and/or a surfactant laden fluid.

An example procedure includes an acid fluid as an energized fluid, and the modeling further including an energized fluid rheological model and/or an energized fluid reaction kinetics model. An energized fluid includes a gas or a supercritical fluid as a portion of the overall fluid composition. Any type of gas or supercritical fluid is contemplated herein, including at least carbon dioxide and nitrogen. The percentage of the fluid that is gas may be any value known in the art. The modeling may include gas effects on diffusion, diffusion of fluid, acid, and/or reaction products into the gas phase, acid generation from the gas (e.g. carbonic acid from $CO_2$ absorption into a water phase), gas effects on agitation and overall effective mass transfer to the formation face, etc. The composition of the energized fluid throughout the treatment may also be modeled, including exposure to fluids that break down the energized fluid liquid phase and/or diffusion of the gas phase into the formation.

In certain embodiments, the procedure includes determining the micro-pore geometry in the core sample and formation, and accounting for the micro-pore geometry in the modeling. The micro-pore geometry of the formation increases the overall effective surface area of the formation, however diffusion into individual micro-pores, and diffusion of reacted products out of the micro-pores, may be the rate limiting reaction step in certain regimes of temperatures, fluid flow and turbulence, and concentrations of products and reactants. When the geometry of the micro-pores is properly defined, including for example averages (and variability in) depth, diameters, opening diameters, surface area to volume ratios, and geometric shape characteristics (e.g. cylindrical, tapered, fractal, etc.), then the effect of the micro-pore structure on the overall reaction rate can be modeled. Several CT scan tools, discussed herein and otherwise available, are capable of determining the micro-pore structure of a core sample, and the core sample can be extrapolated, potentially with other core sample data, to a formation micro-pore profile for modeling the treatment.

An example procedure includes performing an operation to determine a temperature feedback prediction in response to the predetermined treatment. The feedback prediction can be a temperature prediction for any measurable location, based upon the temperature affecting aspects of the treatment, including reaction exotherms, heat transfer values, initial fluid and formation temperatures, heat of mixing and phase change values, and any other modeled temperature parameters. The procedure further includes an operation to measure the temperature feedback, either during or after the predetermined treatment. The procedure further includes an operation to verify a wormhole geometry, a reaction rate, and/or a heat transfer model in response to the temperature feedback prediction and the temperature feedback. Example temperature feedback operations include temperature logs in a wellbore, temperature information derived from a distributed sensor fiber optic cable (either in a wellbore or associated with a core sample), temperature information from distributed temperature sensors in a wellbore, and/or temperature determinations of a core sample during a treatment simulation (e.g. optical temperature determination from the core sample surface). Additional or alternative temperature samples include a core temperature distribution value, a distributed wellbore temperature value, a temperature value taken after the predetermined treatment is performed, and a temperature value taken during the predetermined treatment. The described modeling and verification operations via temperature are non-limiting examples.

In certain embodiments, an example procedure includes evaluating the generated porosity with an acoustic property model, and acoustically interrogating the formation of interest after the predetermined treatment. For example, the model may show a generated porosity near the wellbore and/or in the core sample that should be in place when the treatment is completed. The acoustic signature that should be exhibited by the formation or the core sample can be determined according to the model outcome of the generated porosity, including with knowledge of the fluid in the pore spaces and/or the wettability and wetting fluid of the formation or core sample. A comparison of the expected and realized acoustic signatures can determine the accuracy of the model and the efficacy of the treatment. For example, if the near wellbore porosity is greater than expected, a treatment will probably not have as much stimulation in the intermediate zone away from the wellbore for a given amount of acid injected. Accordingly, adjustments such as a lower acid strength, acid inhibition in the early treatment stages, and/or a greater injected volume of acid may be contemplated. In certain embodiments, a procedure includes an operation to determine a benchmark acoustic response, and to determine a treatment efficacy in response to the acoustic interrogation and the benchmark acoustic response.

The improvements to the modeling of the acid stimulation can be utilized at any point in the life cycle of a field, a formation, or a commercial fluid. For example, treatment operations may be analytically optimized using core samples for a new field before treatments begin, and with real-time feedback from the field a best practice for the field that meets the economic or other goals of the field operations can be rapidly developed. In another example, a commercially available fluid or fluid product may be found to have new applications or best practices developed through the modeling of the effects of the fluid or product on certain types of formations.

Example and non-limiting output parameters from a modeling operation include adjusting an acid concentration in response to the modeling, adjusting a treatment rate (pumping rate) for the predetermined treatment, and/or adjusting a treatment volume for the predetermined treatment. Another example parameter from a modeling operation includes adding, adjusting, or removing an acid fluid stage from the predetermined treatment, including adding flush or overflush stages, initial displacement stages, and/or adjusting post-treatment shut-in times. Another example parameter includes adjusting an acid fluid composition during at least a portion of the predetermined treatment, where the composition can include acid concentrations or type, encapsulated materials, degradable materials, fluid loss additives, surfactants, emulsions, energized fluid components, inhibitors, viscosifiers and/or breakers, fibers, or any other composition changes known in the art. An example parameter includes adjusting a rheological property of an acid fluid during at least a portion of the predetermined treatment, and/or performing any one or more of the described adjustments in real-time during a treatment.

The example described following depicts an example rotating disk apparatus that can be utilized to determine diffusion and/or surface reaction coefficients for a contemplated fluid. It should be noted that fluid testing and data recordation for particular fluid formulations is routine in the matrix acidizing and wellbore stimulation art. Accordingly, although a given fluid formulation and design may require that diffusion and/or surface reaction coefficients for the acid formulation are to be determined in a lab environment, such fluid analysis is routine and not undue. Further, when a number of acid formulations have been characterized, on an ongoing basis many types of treatments will be performable without any data taking or testing. An acid formulation can include any additives and other fluid elements which may have an effect on the diffusion coefficients.

The acid reaction kinetics of a strong acid reacting with a carbonate involves three steps including (1) the transport of $H^+$ ions from the bulk solution to the surface of carbonate, (2) the reaction of $H^+$/carbonate takes place on the surface of carbonate, (3) the transport of the reaction products from the carbonate surface to the bulk solution. The reaction kinetics between HCl and limestone is considered to be mass transfer limited under reservoir conditions. The mass transfer rate is a function of flow rate, fluid viscosity and structure, and diffusion coefficient. Flow rate and fluid viscosity can be accessible, but acid diffusion coefficient is not an easy property to measure. Therefore, the knowledge of the diffusion coefficient of hydrogen ions from the bulk solution to the rock surface is the key to characterizing the rate of dissolution of carbonate rocks during acid-carbonate reaction. The rotating disk apparatus can be used to study diffusion coefficient of acids during the carbonate dissolution process. Numerous publications have been devoted to the subject.

The general formula for the HCl/calcium carbonate reaction is:

$$CaCO_3 + 2HCl \rightarrow CaCl_2 + H_2O + CO_2 \quad (1)$$

Assuming that the reaction is mass transfer limited, the overall reaction rate of reaction (1) can be expressed by $$J = K_{mt}(C_b - C_s) \quad (2)$$

Where: J=Reaction Rate (mole/cm²·sec); $K_{mt}$=Mass Transfer Coefficient (cm/sec); $C_b$=Bulk Acid Concentration (mole/cm³); and $C_s$=Surface Acid Concentration (mole/cm³). The mass transfer coefficient in a rotating disk apparatus (RDA) has been solved by Levich. For a Newtonian fluid:

$$K_{mt} = 0.62 * D^{2/3} * v^{-1/6} * \omega^{1/2} \quad (3)$$

Where v=kinematic viscosity (cm²/sec); D=diffusion coefficient (cm²/sec), and ω=disk rotating speed (rad/sec).

At steady-state, the flux of $H^+$ ions onto the surface of marble disk is equal to twice the flux of $Ca^{2+}$ ions leaving the surface:

$$J_{H^+} = 2 * J_{Ca^+} \quad (4)$$

Therefore, during a rotating disk experiment, the flux $J_{H}^+$ is obtained from the analysis of $Ca^{2+}$ in the solution. Combining Eq. 2 and 3, the reaction flux is expressed as:

$$J_{H^+} = 0.62 * D^{2/3} * v^{-1/6} * \omega^{1/2}(C_b - C_s) \quad (5)$$

Where the reaction speed is fast enough, or disk rotational speed is low enough, that mass transport is limiting, $C_s \ll C_b$, and rearranging Eq. 5 yields:

$$\frac{J_{H^+}}{0.62 * v^{-1/6} * C_b} = D^{2/3} * \omega^{1/2} \quad (6)$$

Using Eq. 4:

$$\frac{J_{Ca^{2+}}}{0.31 * v^{-1/6} * C_b} = D^{2/3} * \omega^{1/2} \quad (7)$$

The experiment is repeated at different rotational speeds (RPM) by keeping all other parameters constant (e.g. temperature, acid concentration). Using the measured $Ca^{2+}$ and Eq. 7, a straight line can be produced by plotting $$\frac{J_{Ca^{2+}}}{0.31 * v^{-1/6} * C_b}$$

versus $\omega^{1/2}$, which gives a straight line with a slope equal to $D^{2/3}$.

Additionally, for reactions that are not mass transfer limited, an additional factor is introduced, —the surface reaction rate, Jsr given by:

$$J_{sr} = K_{sr} C_s^n (1-\phi)$$

Where: $K_{sr}$=surface reaction coefficient; $C_s$=Acid concentration at surface; $\phi$=porosity.

Presently known wormhole and acid modeling systems utilize the diffusion coefficient of fresh acid to calculate wormholing process. Using a fresh acid diffusion coefficient is fine for wormholing phenomena near the wellbore, but as the wormholes penetrate deep into the formation, the tip of the wormhole contains predominantly spent acid. Using the fresh acid diffusion coefficient could significantly overestimate the dissolution rate. To properly quantify the acid penetration deep into the formation, the procedure herein utilizes the diffusion coefficient of the appropriate acid, including the diffusion coefficient of spent acid where the acid is spent.

To obtain the optimal injection rate or to compare acid efficiency among different acids, linear core experiments are usually conducted in the lab. The concept of pore volume to break through (PVBT) has been used to interpret the acid efficiency. The PVBT is also used to quantitatively scale up from linear core to the radial flow geometry encountered in the real reservoirs. The cores commonly used in characterizing the PVBT are 3 to 6 inches. However, recent experiments conducted in our lab that show that 3 to 6 inch cores may be insufficient to quantitatively extrapolate the short core experimental results into field scale design. The misconception derived from interpreting the short core experiments is that the wormhole velocity is constant because fresh acid is always available at the tip of the wormhole. This results in overestimating the wormhole penetration depth in the real reservoir.

Another common practice in core flow experiments is using 1000 psi as the system pressure. Many researchers claim 1000 psi is sufficiently high to keep the evolved $CO_2$ in solution hence the results obtained using such pressure is applicable to real reservoir pressure, which is normally much higher than 1000 psi. Recent thermodynamic studies and experiments conducted have indicated that 1000 psi may not be high enough to keep $CO_2$ in solution, and the wormholing phenomena at 1000 psi is not representative of that at true reservoir pressure. The reaction rate in the real reservoir is in fact lower than that under this lab pressure condition. Consequently, using data from core flow experiments conducted at 1000 psi system pressure can lead to underestimation of wormhole penetration.

In the past decades, carbonate acidizing has been a topic of active research. Extensive experimental investigation and theoretical modeling effort have been done on carbonate matrix acidizing. However, these models were not able to predict wormhole penetration accurately because they focused on only some of the acidizing mechanisms. Presently known models have not considered the impact of reaction products to the reaction kinetics of carbonate rock/$H^+$, which is detrimental to accuracy where the mass diffusion step is the rate limiting step. The presented experimental design and theoretical framework provides a quantitative 3D model to accurately predict wormhole penetration velocity and morphology. The 3D core model is built based on CT scans of core samples such that the real rock structure, in terms of heterogeneity, is captured. In one example, the kinetics revealed by the rotation disk experiments are incorporated in a two-scale continuum model to simulate the acidizing process. Certain model details are known and do not need to be repeated herein, but details can be found at Panga, M., Ziauddin, M., and Balakotaiah, V., *Two-Scale Continuum Model for Simulation of Wormholes in Carbonate Acidization*, AICHE, 51(12), 2005, which is incorporated herein by reference in the entirety for all purposes. Fluid flow and solute diffusion through the medium, coupled with the acid-formation reaction, is modeled, and acidizing progressions and wormhole profiles are obtained.

Figure 5:
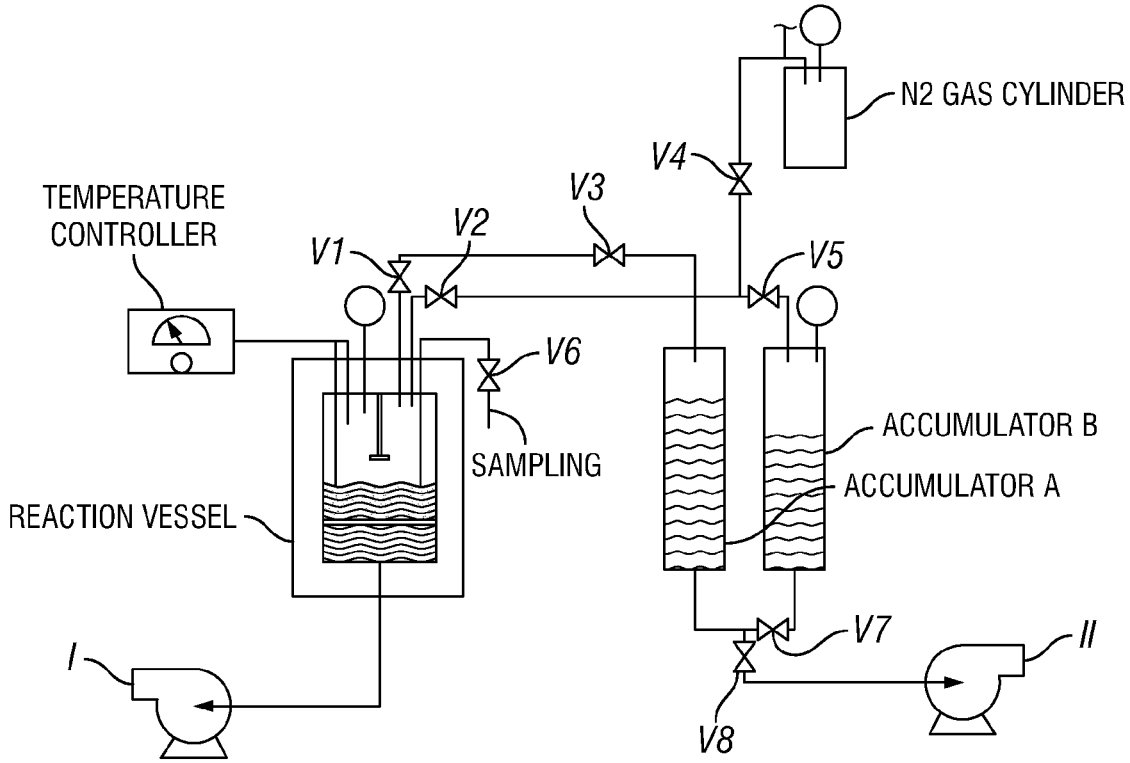
FIG. 5 shows an exemplary rotating disk apparatus (RDA) according to an embodiment of the current application.
Figure 6:
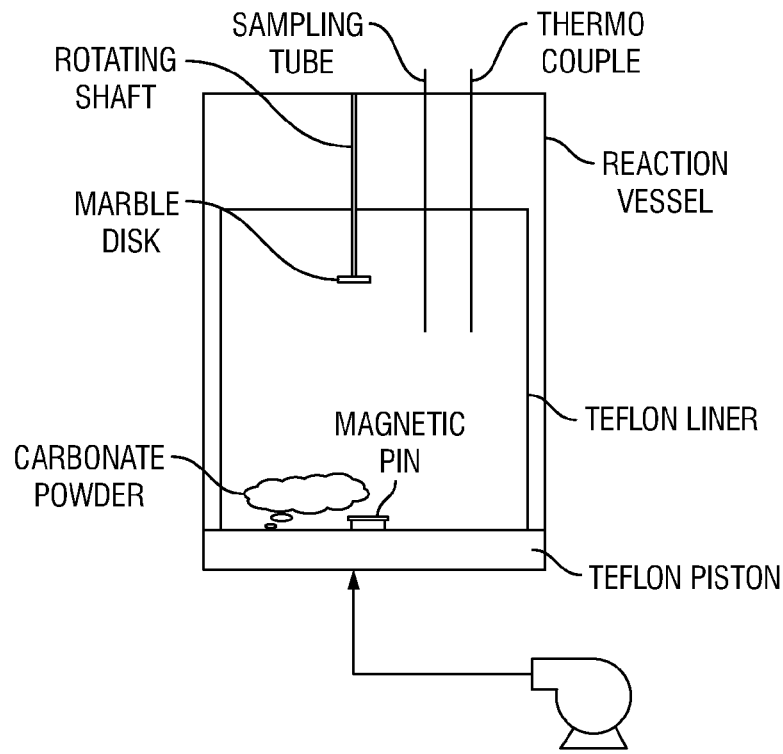
FIG. 6 shows an improved RDA according to an embodiment of the current application.

The example experiment setup and procedure is adjusted from a traditional rotating disk apparatus (RDA). An example RDA is depicted in FIG. 5. The apparatus includes two ISCO pumps, an acid reservoir, a reaction vessel with a magnetic drive assembly and surrounded by a heating jacket, and associated pressure regulators, valves, temperature and pressure displays and controllers, in addition, a data acquisition system is established to closely monitor the temperature and pressure inside of reaction vessel. The disks are made of pure marble (or other carbonate rocks) with required diameter and thickness. An example experimental procedure includes:

(1) Precisely measured carbonate powder is displayed in a teflon liner, which is located inside of a reaction vessel and the piston is positioned in the bottom of the reaction vessel. The disk is mounted on the spindle using heat-shrink Teflon tubing, so only the lower face was exposed to acid. A new disk was used for each experiment. The disk-spindle assembly was installed on the rotating shaft of the reaction vessel (see FIG. 6.).

(2) The reaction vessel is pressurized to the desired level with nitrogen (backpressure) and the temperatures of the reaction vessel and the acid reservoir are heated to the same value.

(3) After the pressure and temperature stabilized, the disk rotation is started and the acid is injected from the reservoir to the reaction vessel by pressurizing the acid reservoir to a higher pressure than the pressure in the reaction vessel using nitrogen gas.

Figure 7:
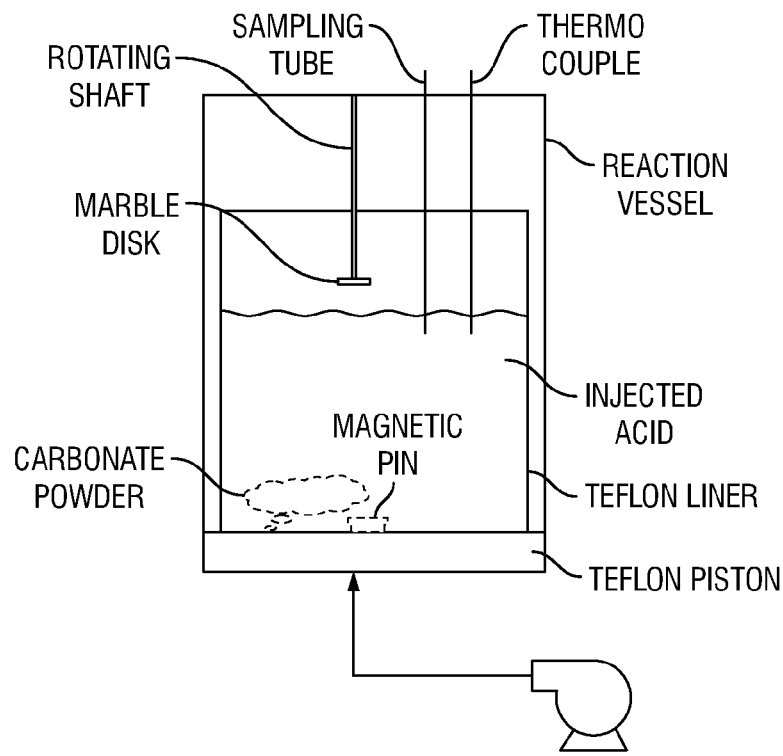
FIG. 7 shows an RDA with injected acid according to an embodiment of the current application.

(4) The injected acid is reacting with the displayed carbonate powder under proper mixing by a magnetic stirrer (see FIG. 7.).

Figure 8:
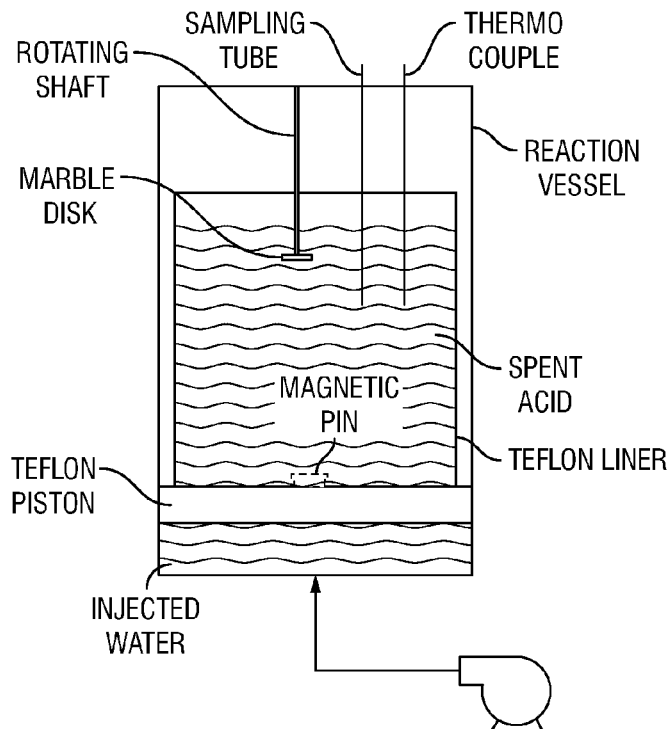
FIG. 8 shows an RDA with displaced water pushing up the piston.

(5) After the reaction between the carbonate powder and the injected acid is completed, the concentration of acid and the produced counter ions are exactly as expected. In addition, a portion of the produced $CO_2$ will be dissolved in the solution due to the initially applied backpressure. Simulated spent acid is therefore ready for a second stage. The ISCO starts to inject water at a relatively high flow rate. The displaced water pushes the Teflon piston up, and therefore the spent acid level will be increased until the rotating disk is completely immersed in the spent acid (FIG. 8.).

(6) Time recording is started as soon as the rotating disk is completely immersed into spent acids. During the experiment, effluent sample was extracted every minute for a period of 5 minutes and each sample volume was about 10 mL. The sampling tubing was purged prior to collecting each sample. All sample volumes were recorded, as the $Ca^{2+}$ concentration is based on the remaining volume of acid in the reaction vessel at the sampling moment.

(7) The $Ca^{2+}$ ion concentration in each collected sample is analyzed for later calculation of the diffusion coefficient.

An example calculation and procedure to formulate a spent acid sample is described following. To prepare 1 L of 10% spent acid (HCl) from an initial concentration of 15% fresh acid, a stoichiometric calculation of the fresh and spent acid is performed, and 15% acid is reacted with the appropriate amount of calcium carbonate until the acid is reduced to a 10% concentration. In the example, 15% HCl includes 4.4174 mol/L, and 10% HCl includes 2.8767 mol/L, or 1.5407 mol of HCl need to be reacted from 1 L of 15% HCl to produce 1 L of spent 10% HCl. Each 2 mol of HCl reacts with 1 mol of $CaCO_3$, and accordingly 0.77035 mol of CaCO3 need to be placed in the Teflon liner (reference FIG. 5). The molecular weight of CaCO3 is 100.09 g/mol, or 77.104 g of CaCO3 will react with 1 L of 15% HCl to produce 1 L of 10% HCl. One of skill in the art, having the benefit of the disclosures herein, can determine the reactant weights and volumes to simulate the fresh and spent acid concentrations of interest. The fresh acid starting point should be the fresh acid utilized or planned in the treatment, and could include several values, for example where several stages using different fresh acid concentrations are utilized. The spent acid point can be taken as low as desired, but should be taken as low as the expected spent acid concentration in the modeled or performed treatment. However, it is also possible to take at least one spent acid data value and extrapolate beyond the experimental data.

The example described following depicts an example core flow apparatus that can be utilized to determine diffusion coefficients for a contemplated fluid. It should be noted that core testing and data recordation for formations within a field or geographical area is routine in the matrix acidizing and wellbore stimulation art. Accordingly, although characterization of a given formation within a field or geographical region may require sampling and scanning of one or more cores, or even a large number of cores for a complex or highly heterogenous formation mineralogy, such core sampling and analysis is routine and not undue. Further, when a formation has been well characterized, on an ongoing basis many types of treatments will be performable without any core sampling or analysis. Also note that the core flow testing performed in the example analysis following demonstrates the effects of depleted acid, and is not routinely performed as a part of the procedures herein. Core flow analysis performed herein includes CT scanning and micro-scanning, but not as often includes core flow testing. In certain embodiments, core flow testing may be performed to verify an acid formulation and/or calibrate a model.

Figure 9:
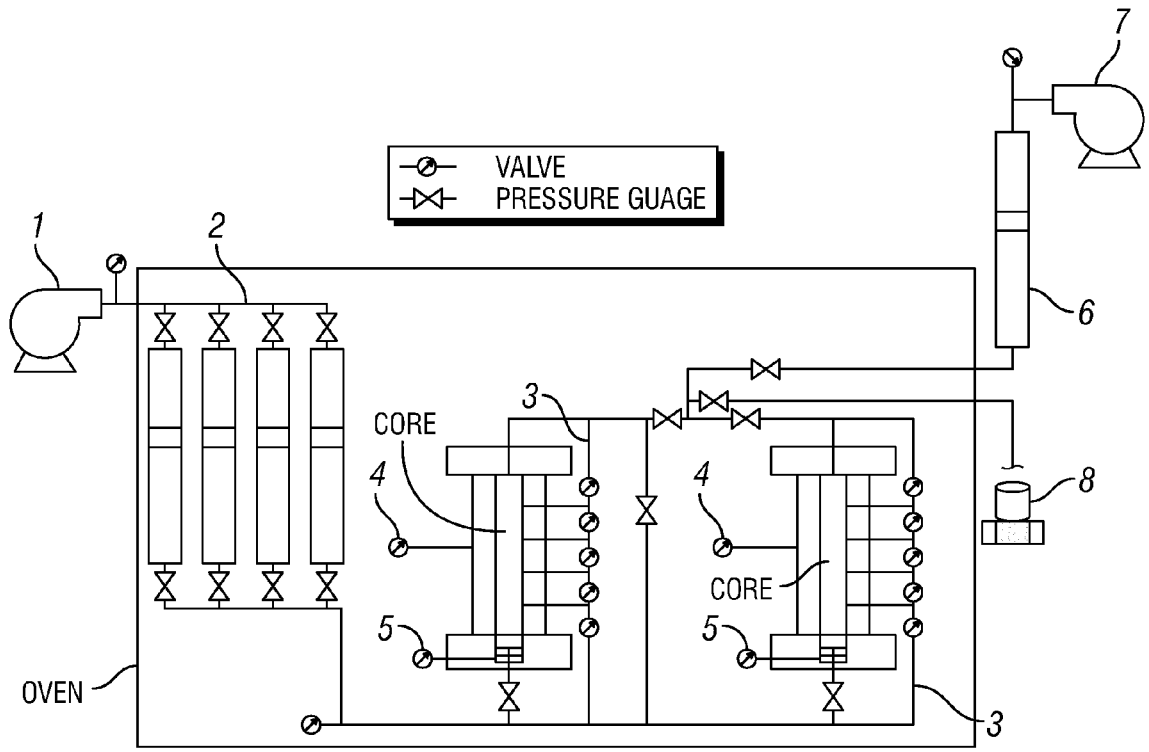
FIG. 9 shows a high pressure, high temperature core flow equipment according to an embodiment of the current application.

The high-pressure high temperature core flow equipment depicted schematically in FIG. 9 houses a 1.5" diameter by 12" long core. Differential pressure ($\delta p$) can be measured along the core at 2.4" intervals using a multi-tapped rubber sleeve, allowing for 5 $\delta p$ measurements along the core. The $\delta p$ allow for tracking of wormhole propagation. An example procedure for the core flow test includes:

(1) Saturate a 1.5" diam., 12" long, carbonate core with fresh water.

(2) Load the saturated core into the core holder. Apply axial stress of 80 to 150 psi to ensure the injection end block comes in close contact with the core face.

(3) Apply the desired axial and confining stress to the core.

(4) Inject water through the core at atmospheric pressure until the system is free of air.

(5) Apply desired back pressure.

(6) Continue water injection with applied back pressure to measure the initial permeability of the core.

(7) Inject acid through the core at a constant rate. Measure and record $\delta p$ values until acid break through of the entire 12" core.

(8) Post flush the core with water.

(9) Remove the core from the core holder. Core may be scanned to characterize wormholing more fully (e.g. CT scan).

Figure 10:
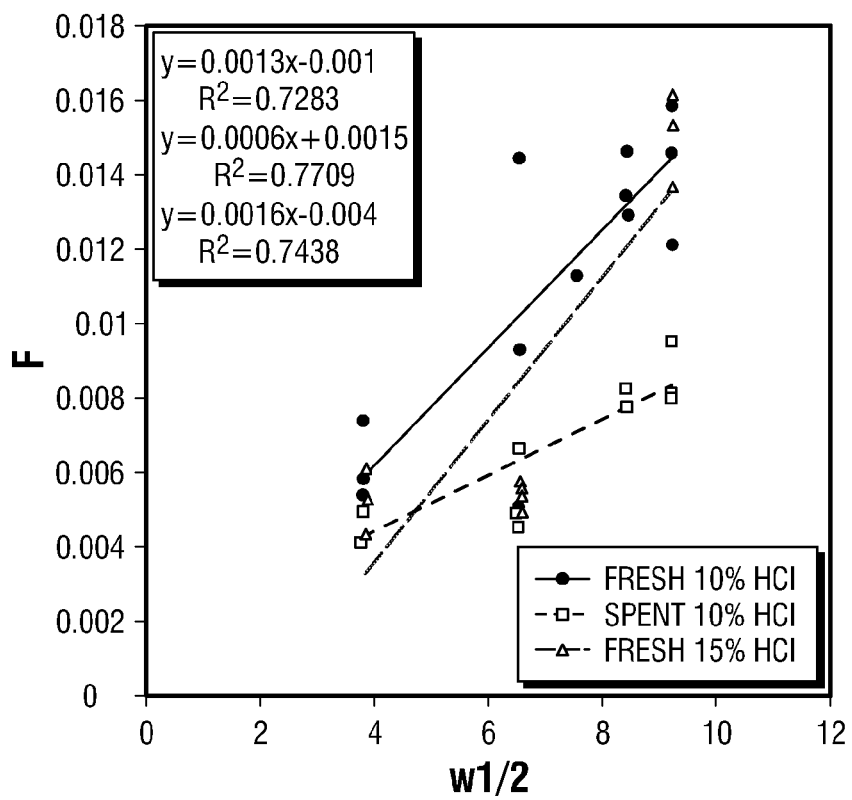
FIG. 10 shows the plotting of exemplary data according to an embodiment of the current application.

The results from the sample testing are described following. The illustrative example data is characteristic of the tested fluids and core sample only, and is non-limiting. The reaction fluxes ($J_{Ca^{2+}}$) for the 3 acids were plotted (not shown) against the square root of rotating speed ($\omega^{1/2}$). The $J_{Ca^{2+}}$ of 15% HCl—CaCO$_3$ reaction was the highest, followed by the $J_{Ca^{2+}}$ of 10% fresh HCl, and the $J_{Ca^{2+}}$ of the 10% spent HCl—CaCO$_3$ reaction was the lowest. Utilizing Eq. (7) and using the flux, kinematic viscosity, and the known bulk acid concentration, the term $$\frac{J_{Ca^{2+}}}{0.31 * v^{-1/6} * C_b}$$

was plotted against the square root of rotational speed $\omega^{1/2}$. The results are depicted in FIG. 10. The effective diffusion coefficient was therefore calculated from the slope of each data set. The effective diffusion coefficient of fresh 15% HCl was 6.4 E-5, the effective diffusion coefficient of the 10% fresh HCl was 4.68 E-5, and the effective diffusion coefficient of the 10% spent HCl was 1.47 E-5. Comparing the effective diffusion coefficients from the 10% fresh and 10% spent HCl tests clearly demonstrates that the diffusion coefficient is significantly lower in spent acid.

Two core flow tests were performed, both utilizing Indiana limestone outcrop cores of 1.5" diameter and 12" length in a system such as depicted in FIG. 9. The cores were acidized with 15% HCl having 0.2% of a corrosion inhibitor (Schlumberger chemical code A262, which is a commercially available aromatic hydrocarbon based substance, but the exact formulation is not relevant to the illustrative test described herein). The cores were injected at 2 mL/min, and both tests exhibited similar permeability. The core for the first test exhibited a 1.8 mD permeability, and had a 15% bulk porosity. The core for the second test exhibited a 0.6 mD permeability, and had a 15% bulk porosity. The back pressure utilized for the first core was 1000 psi, and the back pressure utilized for the second core was 3000 psi.

Figure 11:
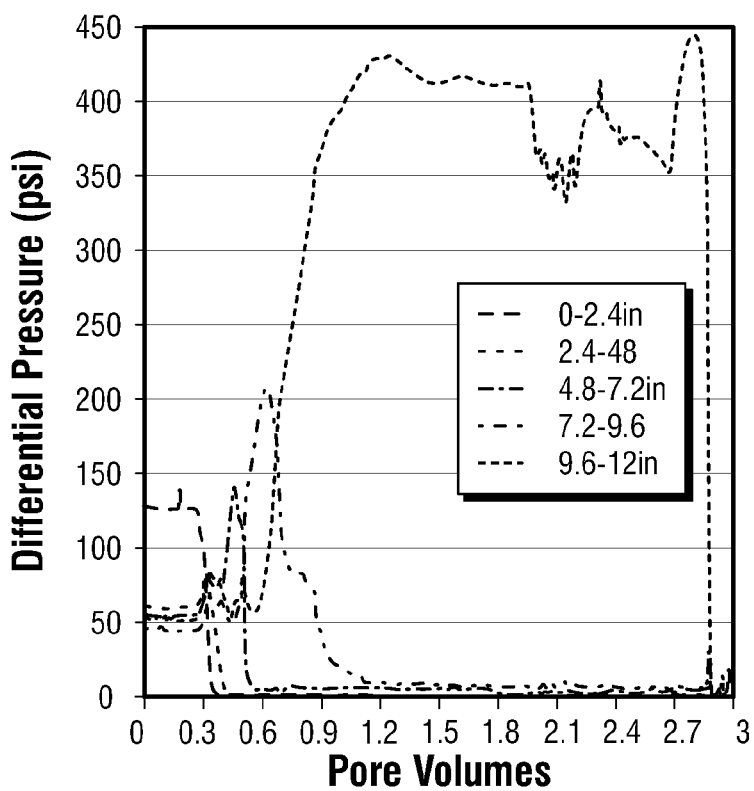
FIG. 11 shows the plotting of exemplary differential pressure vs. pore volumes of a first core according to an embodiment of the current application.
Figure 12:
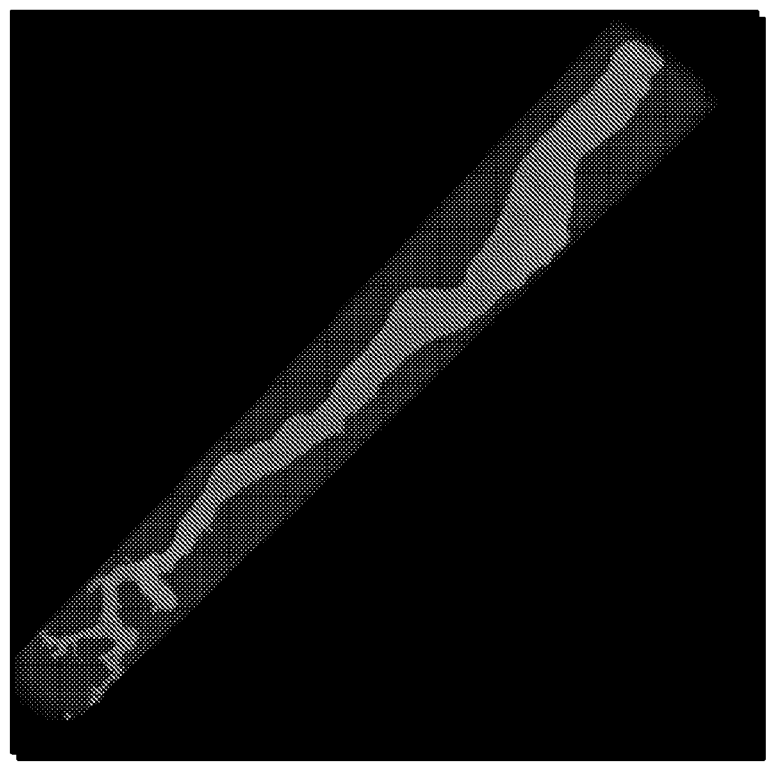
FIG. 12 shows the scan of the first core with a large wormhole diameter near the injection point.

The results for the first core are depicted in FIG. 11. It can be seen that the pore volume at which each $\delta p$ along the core dropped to zero (indicating wormholing had reached that $\delta p$ sensor) demonstrated that the incremental acid volume required to reach each sequential sensor was increasing, consistent with the wormhole generation velocity decreasing away from the injection point. Referencing FIG. 12, the scan of the first core shows a very large wormhole diameter near the injection point (upper right).

Figure 13:
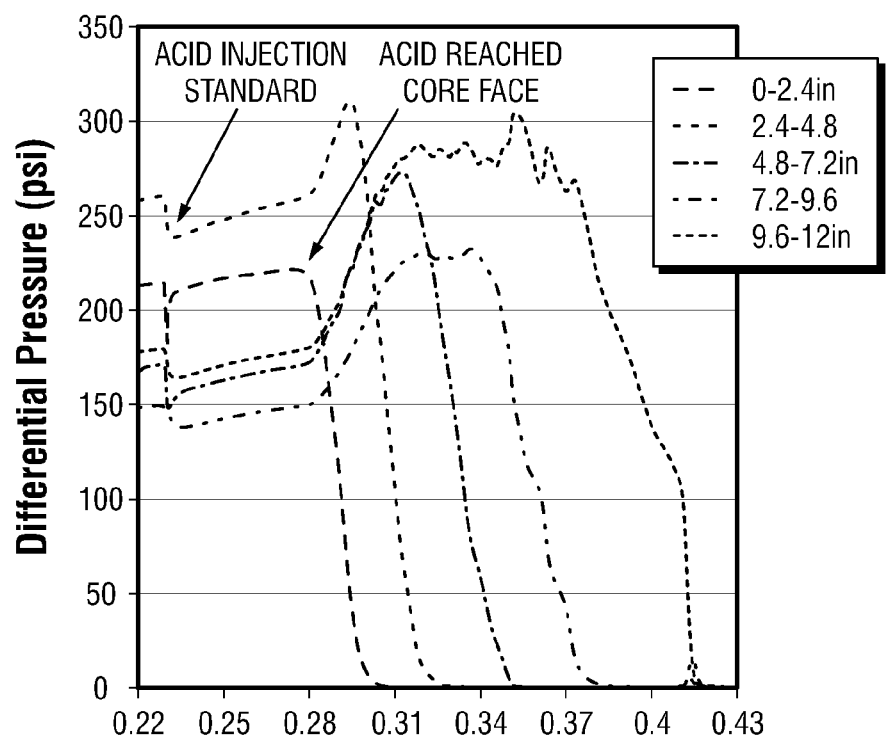
FIG. 13 shows the plotting of exemplary differential pressure vs. pore volumes of a second core according to an embodiment of the current application.
Figure 14:
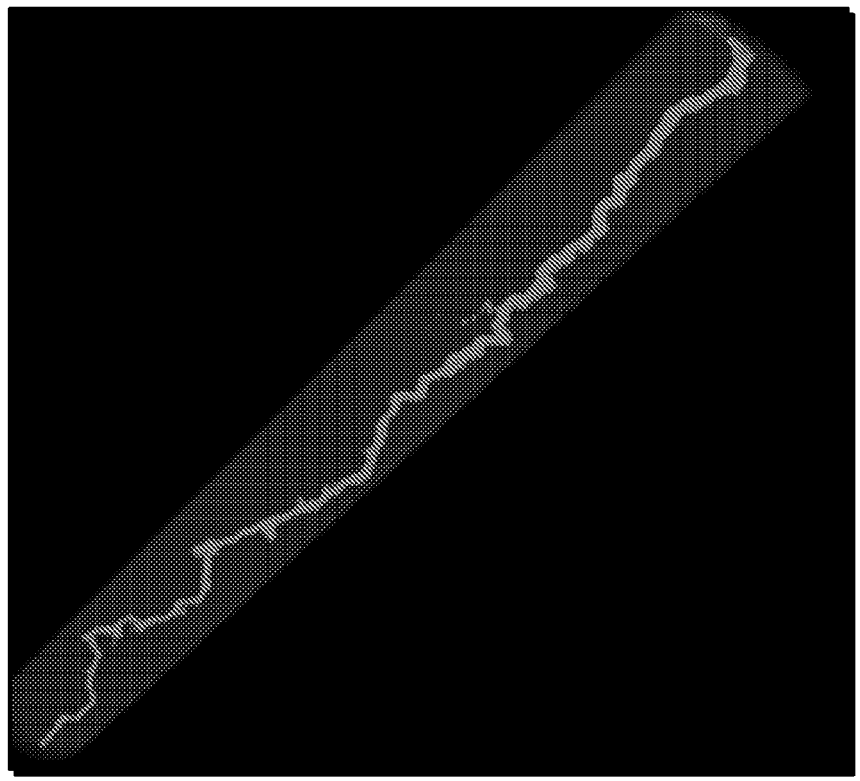
FIG. 14 shows the scan of the second core with a more uniform wormhole diameter throughout the core.

The results for the second core are depicted in FIG. 13. It can be seen that virtually the same incremental amount of acid was required to reach each of the sequential $\delta p$ sensors, until the last sensor (the 9.6" to 12" section of the core) which required a bit more acid than the earlier sections. Referencing FIG. 14, the scan of the second core shows a much more uniform wormhole diameter throughout the core, although it is again a bit wider near the injection point (upper right).

The core tests and scans appear to indicate that the in-situ pressure is quite relevant to the wormhole geometry. It is believed at 3000 psi backpressure, the CO$_2$ stayed in solution much better than at 1000 psi backpressure. This inhibited the reaction rate in two ways—first the CO$_2$ in solution is a competing diffusion component, slowing mass transfer of hydronium ions to the surface of the formation face, and second the CO$_2$ bubble formation size of any gas out of solution at 3000 psi back pressure will be much smaller. These two effects both slowed the reaction rate and can be modeled. These data indicate that the industry standard of using 1000 psi back pressure can provide unreliable results, but they also indicate that modeling the actual situation encountered in the wellbore can significantly affect the quality and utility of the model outputs.

Figure 15:
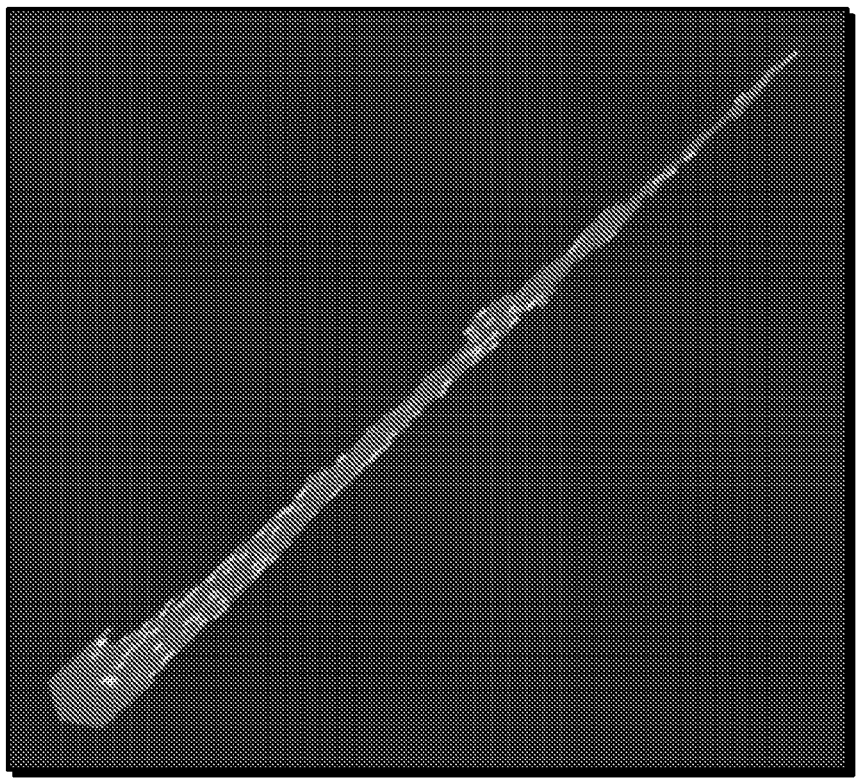
FIG. 15 is a numerically modeled acid treatment according to an embodiment of the current application.
Figure 16:
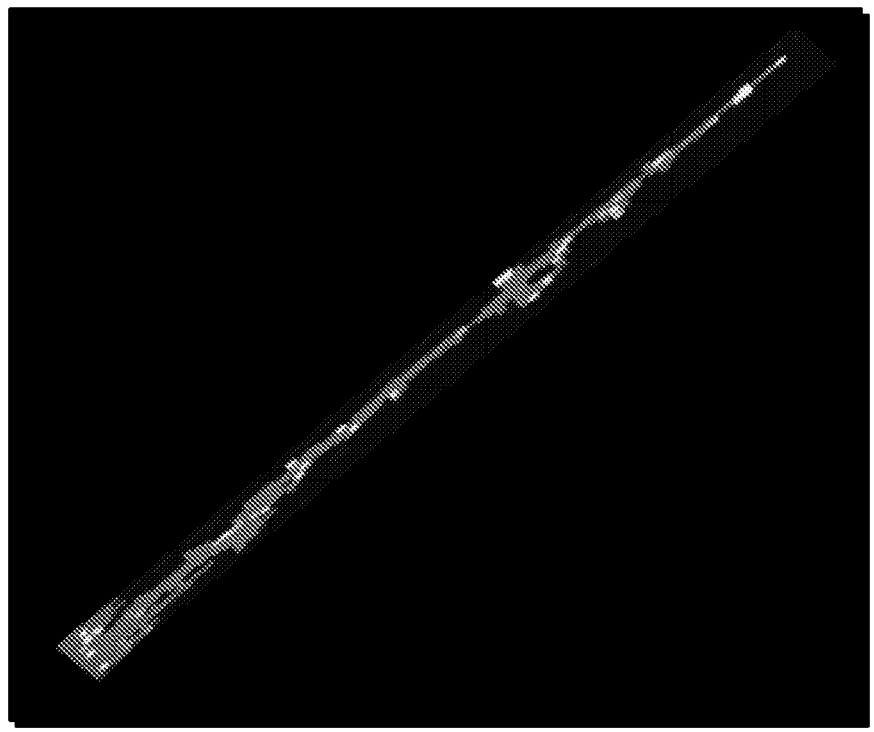
FIG. 16 is another numerically modeled acid treatment according to an embodiment of the current application.

Referencing FIG. 15, a numerically modeled acid treatment is depicted. The model size was 40×40×180 mm, and the voxel size selected for the model was 0.94×0.94×1.0 mm. The simulation of FIG. 15 estimated a breakthrough volume of 108 mL. Referencing FIG. 16, a numerically modeled acid treatment is depicted. In the example of FIG. 16, acid expenditure was calculated, and the mass diffusion coefficients were adjusted accordingly. It can be seen that the overall wormhole diameter is much narrower, especially just past the point of injection. Note that in both models of FIG. 15 and FIG. 16, the CT scan determined porosity field was utilized for the simulation. The estimated breakthrough volume of the simulation in FIG. 16 was 22 mL. Accordingly, accounting for acid expenditure effects on the reaction kinetics of an acid treatment can dramatically affect the quality of the simulation.

Figure 17:
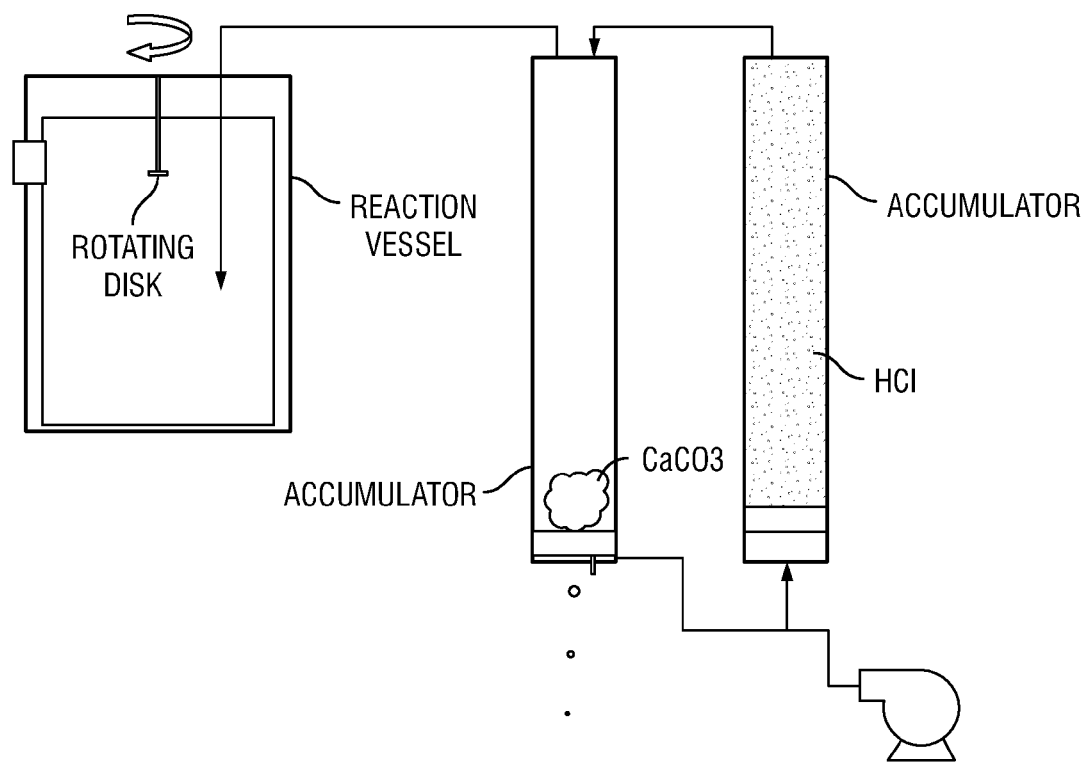
FIG. 17 is a schematic illustration of an experimental setup for a spinning disk device to determine diffusion coefficients for spent acid according to an embodiment of the current application.

Referencing FIG. 17, another embodiment of an experimental setup for a spinning disk device to determine diffusion coefficients for spent acid is depicted. An amount of a base material is provided in the vessel marked with "$CaCO_3$". The base material in one example is analogous to the formation material of interest, such as $CaCO_3$ for a limestone formation. The base material may be adjusted for a dolomite or other formation, or $CaCO_3$ may be utilized as the final reaction products will yield a similar diffusion environment for the spent acid. The number of moles involved in the reaction as well as the final composition of the spent acid fluid may be considered when determining an appropriate base material.

The acid is provided in the accumulator vessel marked with "accumulator" and "HCl". The acid is, in one example, of a similar composition to the fresh acid for the planned treatment, such that the composition of the spent acid is similar from a diffusion perspective to the spent acid that will be present during the treatment. A treatment may utilize more than one acid concentration, for example at various stages during the treatment, so more than one acid concentration may be tested. Further, more than one acid concentration may be tested to determine which acid concentration best meets the goals of the particular treatment, including near wellbore permeability versus permeability generated away from the wellbore, achieved wormhole lengths or diameters, or other parameters that may be considered. A pump is provided that can pressurize various plungers and thereby move fluids between vessels. A reaction vessel is also provided with the rotating disk having a composition similar to the formation composition—for example a marble disk may be utilized as described preceding.

When the spent acid is positioned in the reaction vessel, the disk is rotated and periodic fluid samples are taken. The fluid volumes of the total fluid and sampled fluids are tracked, and the reaction progression over time can thereby be determined. Calculations such as those disclosed in equations 2 through 6 can be utilized to determine the diffusion coefficients for the spent acid. The reaction formula in equation 1 can be adjusted according to the materials utilized, for example where the acid or formation materials are different from HCl or $CaCO_3$.

Figure 18:
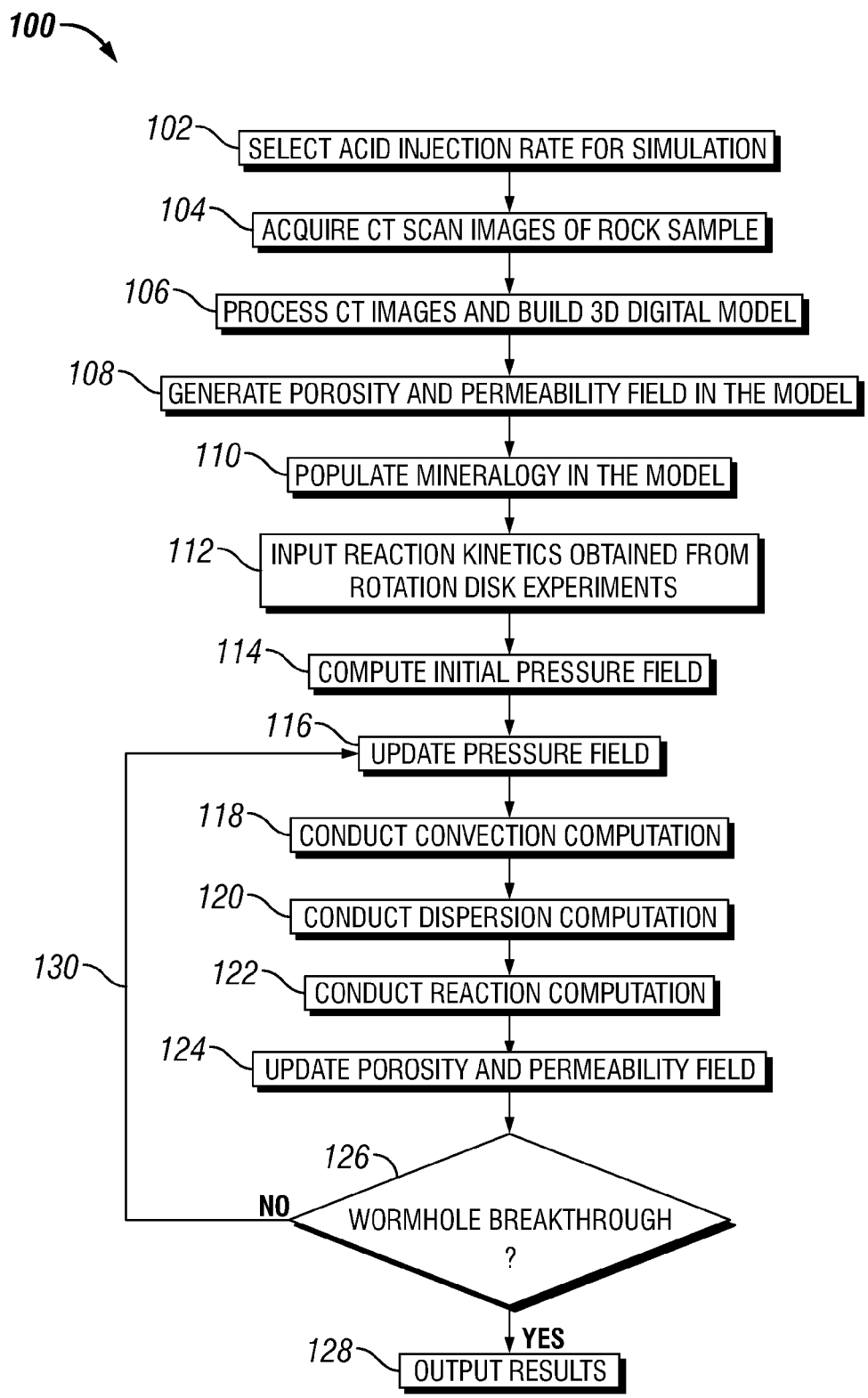
FIG. 18 is a schematic illustration of a general operation procedure according to an embodiment of the current application.

Referring now to FIG. 18, a general operation procedure (100) is schematically illustrated. In this embodiment, an acid injection rate is first selected for simulation (102) and the rock samples or cores are then scanned by CT or other imaging apparatus with the images of the rock samples properly acquired (104). The CT images are processed to build a 3D digital model (106) and the porosity and permeability fields are generated in the model (108). The mineralogy fields in the model can also be populated (110), and the reaction kinetics obtained from rotation disk experiments can be input into the model (112). Thereafter, the initial pressure filed is calculated (114) and the pressure field in the model is updated (116). A convention computation can be conducted (118). Also can be conducted are dispersion computation (120) and reaction computation (122). The porosity and permeability fields in the model are then updated (124) and the wormhole breakthrough is determined based on the updated fields (126). If a wormhole breakthrough is achieved, the result is output for the user's review and further handling (128). If a wormhole breakthrough does not occur, a feedback loop (130) is triggered to update the pressure field in the model (116).

As is evident from the figures and text presented above, a variety of embodiments according to the present disclosure are contemplated.

While the disclosure has provided specific and detailed descriptions to various embodiments, the same is to be considered as illustrative and not restrictive in character. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Moreover, in reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. It is the express intention of the applicant not to invoke 35 U.S.C. §112, paragraph 6 for any limitations of any of the claims herein, except for those in which the claim expressly uses the words 'means for' together with an associated function.

We claim:

1. A method, comprising:
  performing a computed tomography (CT) porosity scan on a core sample, the core sample comprising a portion of a formation of interest;
  in response to the CT porosity scan, interpreting a porosity profile of the core sample; and
  in response to the porosity profile, modeling a response of a formation of interest to a predetermined treatment to determine a reacted formation configuration, wherein the predetermined treatment comprises an acid fluid treatment schedule, and wherein the modeling further comprises modeling acid fluid flow through the formation of interest having the porosity profile, and wherein the modeling further comprises accounting for acid reaction products during the predetermined treatment and shut-in period
  wherein the modeling further comprises determining a micro-pore geometry, and accounting for the micro-pore geometry.

2. The method of claim 1, further comprising modeling the response of the formation of interest as one of a two-dimensional and a three-dimensional model.

3. The method of claim 1, further comprising accounting for a dynamic and distributed diffusion coefficient of the acid fluid within the formation of interest during the predetermined treatment.

4. The method of claim 3, wherein the modeling further comprises accounting for actual treatment data.

5. The method of claim 3, wherein the determining of diffusion coefficients comprises utilizing a rotating disk apparatus.

6. The method of claim 1, further comprising interpreting a mineralogy profile of the core sample, and wherein the modeling is further in response to the mineralogy profile of the core sample and the modeling further comprises utilizing mineral specific reaction kinetics.

7. The method of claim 1, further comprising one or more of: (1) determining heat generation and thermal conductivity within the formation of interest during the predetermined treatment, (2) determining generated porosity within the formation of interest during the predetermined treatment, and adjusting the thermal conductivity for the generated porosity, (3) interpreting a mineralogy profile of the core sample, and wherein the determining heat generation and thermal conductivity within the formation of interest is further in response to the mineralogy profile of the core sample.

8. The method of claim 7, further comprising evaluating the generated porosity with an acoustic property model, and acoustically interrogating the formation of interest after the predetermined treatment.

9. The method of claim 8, further comprising determining a benchmark acoustic response, and determining a treatment efficacy in response to the acoustically interrogating and the benchmark acoustic response.

10. The method of claim 1, further comprising interpreting a wettability profile, and determining at least one of a diffusion coefficient adjustment and a reaction kinetics adjustment in response to the wettability profile, wherein the interpreting the wettability profile comprises at least one operation selected from the operations consisting of: determining wettability as a function of pore geometry, determining wettability as a function of mineralogy, and determining wettability empirically, and modeling the wettability during the predetermined treatment.

11. The method of claim 1, wherein the modeling further comprises modeling a plurality of acid types in the formation of interest during the predetermined treatment, wherein (1) the plurality of acid types comprise distinct acid fluids from treatment stages of the predetermined treatment, or (2) the plurality of acid types comprise acid fluid changes during the treatment, said acid fluid changes comprising at least one change selected from the changes consisting of: an acid reaction product; an acid resultant product from a precursor; and an acid inhibitor change.

12. The method of claim 1, further comprising determining a temperature feedback prediction in response to the predetermined treatment, measuring the temperature feedback at a time selected from during and after the predetermined treatment, and verifying at least one of a wormhole geometry, a reaction rate, and a heat transfer model in response to the temperature feedback prediction and the temperature feedback.

13. The method of claim 12, wherein the temperature feedback comprises at least temperature determination selected from: a core temperature distribution value, a distributed wellbore temperature value, a temperature value taken after the predetermined treatment is performed, and a temperature value taken during the predetermined treatment.

14. The method according to claim 1, further comprising performing at least one of the operations selected from the operations consisting of:
   adjusting an acid concentration in response to the modeling;
   adjusting a treatment rate for the predetermined treatment;
   adjusting a treatment volume for the predetermined treatment;
   adding, adjusting, or removing an acid fluid stage from the predetermined treatment;
   adjusting an acid fluid composition during at least a portion of the predetermined treatment;
   adjusting a rheological property of an acid fluid during at least a portion of the predetermined treatment; and
   performing any one or more preceding adjustments in real-time during an acidizing treatment.

15. The method of claim 1 further comprising determining the distribution and concentration of reaction byproducts.

16. The method of claim 15 further comprising determining the electrical properties of the reaction byproducts and thereby determining a resistivity and/or dielectric property of the rock and fluid media surrounding the wormhole(s).

17. The method of claim 15 further comprising determining the distribution and quantity of reaction byproducts upon flow back of said fluids to the wellbore.

18. The method of claim 17 further comprising the prediction of the chemical composition of flow back fluids.

19. The method of claim 1, wherein the acid fluid comprises additives to the acid such as corrosion inhibitor, surfactant, solvent or other such non-acid content.

20. The method of claim 1, wherein well log information selected from the group consisting of dielectric, magnetic resonance, formation micro-imaging is integrated to distribute formation properties within a 3D model for acid wormholing in a real well scenario.

* * * * *